United States Patent
Chen et al.

(10) Patent No.: US 10,643,311 B2
(45) Date of Patent: May 5, 2020

(54) METHOD FOR CORRECTING DEHAZED MEDICAL IMAGE

(71) Applicant: Hiwin Technologies Corp., Taichung (TW)

(72) Inventors: You-Min Chen, Taichung (TW); Hung-Chuan Hsu, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 289 days.

(21) Appl. No.: 15/928,439

(22) Filed: Mar. 22, 2018

(65) Prior Publication Data

US 2019/0295224 A1  Sep. 26, 2019

(51) Int. Cl.
*G06T 5/00* (2006.01)
*G06T 7/90* (2017.01)
*G06T 5/50* (2006.01)

(52) U.S. Cl.
CPC ............. *G06T 5/002* (2013.01); *G06T 5/50* (2013.01); *G06T 7/90* (2017.01); *G06T 2207/10068* (2013.01); *G06T 2207/30004* (2013.01)

(58) Field of Classification Search
CPC .. G06T 2207/10068; G06T 5/002; G06T 7/90
See application file for complete search history.

(56) References Cited

U.S. PATENT DOCUMENTS

| | | | | |
|---|---|---|---|---|
| 6,628,825 B1* | 9/2003 | Yamazoe | ............ | H04N 1/6077 358/518 |
| 2003/0053689 A1* | 3/2003 | Watanabe | ............... | G06T 5/004 382/167 |
| 2011/0135200 A1* | 6/2011 | Chen | ................... | G06T 5/003 382/167 |
| 2016/0092472 A1* | 3/2016 | Feder | ..................... | G06F 16/51 382/306 |
| 2016/0300337 A1* | 10/2016 | Hsieh | ..................... | G06T 11/60 |
| 2018/0153384 A1* | 6/2018 | Ikemoto | ................... | A61B 1/00 |
| 2019/0295224 A1* | 9/2019 | Chen | ........................ | G06T 7/90 |

FOREIGN PATENT DOCUMENTS

CN  106846259 A  6/2017

OTHER PUBLICATIONS

He, K et al., "Single Image Haze Removal Using Dark Channel Prior", IEEE Trans. On PAMI, vol. 33, No. 12, 2011, pp. 2341-2353.
(Continued)

*Primary Examiner* — Gandhi Thirugnanam
(74) *Attorney, Agent, or Firm* — Birch, Stewart, Kolasch & Birch, LLP

(57) ABSTRACT

A method for correcting a dehazed medical image is proposed to include: acquiring first saturation values of a medical image and second saturation values of a dehazed medical image in an HSV color space; acquiring a saturation difference value based on the first saturation values and the second saturation values; acquiring a correction value based on the medical image and a threshold value; acquiring a saturation correction value based on the saturation difference value and the correction value; and correcting the dehazed medical image based on the saturation correction value.

10 Claims, 3 Drawing Sheets

(56) References Cited

OTHER PUBLICATIONS

Search Report appended to an Office Action issued to Taiwanese counterpart application No. 106139354 by the TIPO dated May 3, 2018, with an English translation thereof.
Tchaka, K. et al, "Chromaticity based smoke removal in endoscopic images", Proc. SPIE 10133, Medical Imaging 2017: Image Processing, 2017, 101331M, 9 pages.
Yoon, i. et al., "Adaptive Defogging with Color Correction in the HSV Color Space for Consumer Surveillance System", IEEE Transactions on Consumer Electronics, vol. 58, Issue 1, 2012, pp. 111-116.
Zhao, R. et al., "A method of color correction of camera based on HSV model", Proc. SPIE 9284, 7th International Symposium on Advanced Optical Manufacturing and Testing Technologies: Optoelectronics Materials and Devices for Sensing and Imaging, 2014, 92840G, 7 pages.

* cited by examiner

METHOD FOR CORRECTING DEHAZED MEDICAL IMAGE

FIELD

The disclosure relates to image processing, and more particularly to a method for correcting a dehazed medical image, such as a laparoscopic image.

BACKGROUND

Laparoscopy has been widely used in surgeries for the gastrointestinal tract, the abdominal wall, the endocrine system, etc. Different from the traditional laparotomy where the surgeon performs surgery in the abdominal cavity through a single large incision, laparoscopy only requires small incisions (usually 0.5 cm-1.5 cm) for insertion of a variety of cannulas, such that medical devices and the laparoscope lens can enter the abdominal cavity through the cannulas for the surgeon to perform operation while watching images captured by the laparoscope. Laparoscopy enables the surgeons to achieve the same effect as the traditional laparotomy with smaller wounds.

However, if the temperature of the laparoscope lens is lower than the temperature inside the abdominal cavity, the warm air in the abdominal cavity may result in fogs on the laparoscope lens, thereby hazing the laparoscopic images displayed on a screen, and adversely affecting the operation. Dehazing techniques were developed to solve this issue. However, the dehazed images usually have problems of color cast.

In a conventional method to correct color cast of the dehazed image, representation of the dehazed image is converted into an HSV (hue, saturation, value) color space, so as to correct the dehazed image by promoting the value component (i.e., lightness) of the image.

Nevertheless, in laparoscopy, light is provided only by the laparoscope, so environmental brightness may be unstable due to movement of the laparoscope, other devices or tissues in the abdominal cavity. The lightness of the laparoscopic images may be affected by the environmental brightness, thereby causing further color cast in the corrected dehazed image, which is the resultant image obtained after correcting the dehazed image using the conventional method. As a result, the conventional method is not suitable for applications with great environmental brightness variation, such as laparoscopy.

SUMMARY

Therefore, an object of the disclosure is to provide a method for correcting a dehazed medical image, which is suitable for applications with great environmental brightness variation.

According to the disclosure, the method includes steps of: (A) acquiring a plurality of first saturation values of a first medical image in an HSV color space, and a plurality of second saturation values of a second medical image in the HSV color space, the second medical image being obtained by performing dehazing on the first medical image, the first saturation values relating to pixels of the first medical image, the second saturation values relating to pixels of the second medical image; (B) acquiring a saturation difference value based on the first saturation values and the second saturation values; (C) acquiring a correction value based on the first medical image and a threshold value; (D) acquiring a saturation correction value based on the saturation difference value and the correction value; and (E) correcting the second medical image based on the saturation correction value to obtain a third medical image.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
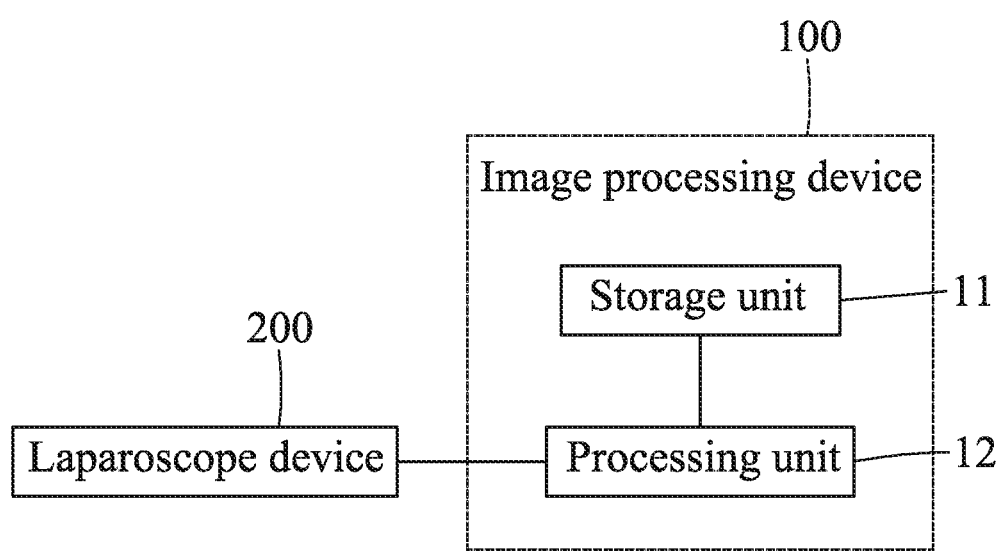
FIG. 1 is a block diagram illustrating an image processing device to implement an embodiment of the method for correcting a dehazed medical image according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, the embodiment of the method for correcting a dehazed medical image is implemented by an image processing device 100. The image processing device 100 includes a storage unit 11, and a processing unit 12 electrically connected to the storage unit 11 and a laparoscope device 200.

The storage device 11 stores a threshold value, a first predetermined value and a second predetermined value. The first predetermined value is greater than the second predetermined value.

The laparoscope device 200 is used to capture a first medical image inside a human body. The first medical image includes a plurality of pixels.

Figure 2:
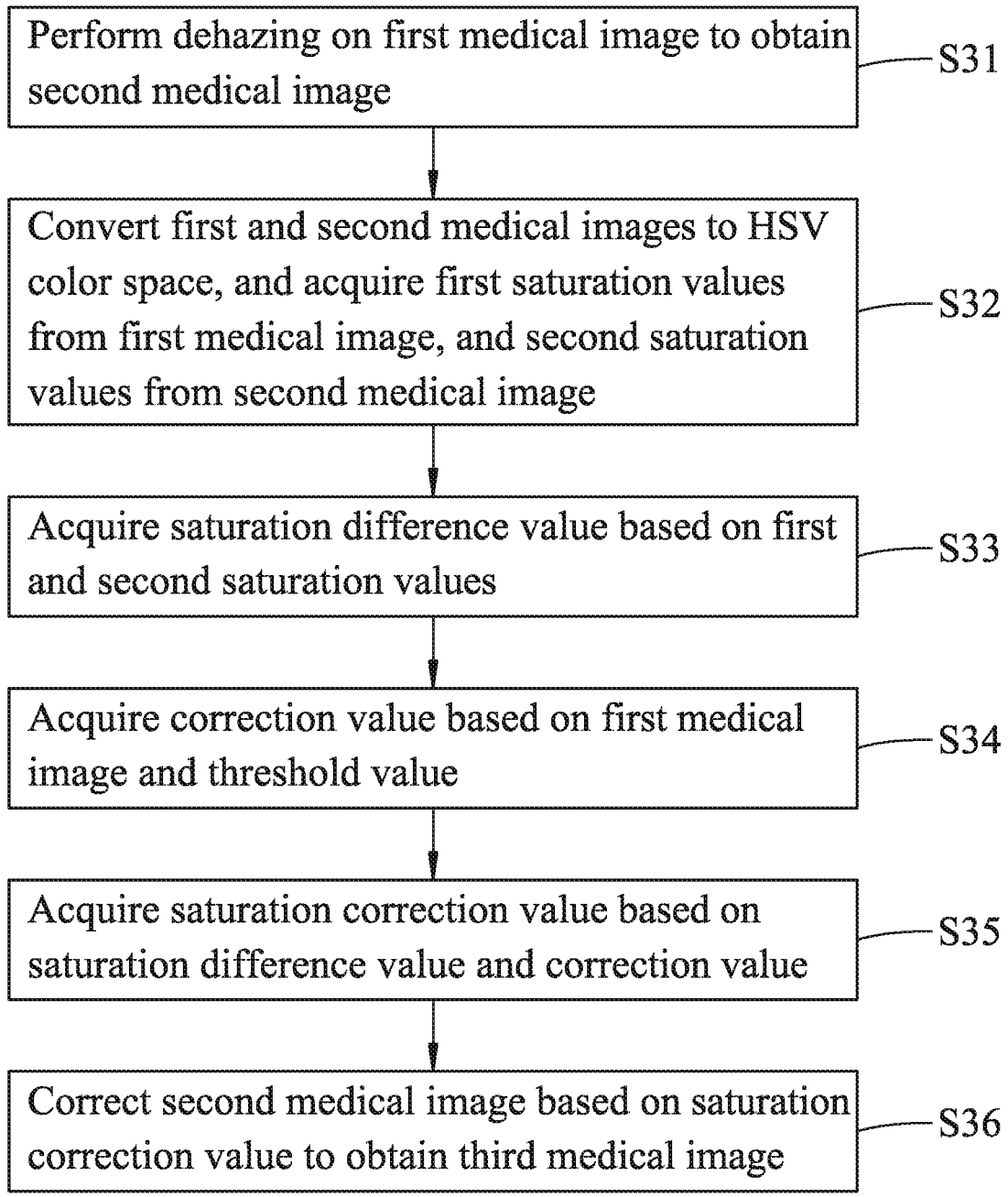
FIGS. 2 and 3 cooperate to form a flow chart illustrating steps of the embodiment.

FIGS. 1 and 2 cooperate to exemplarily illustrate how the image processing device 100 implements the embodiment of the method for correcting a dehazed medical image.

In step S31, after the processing unit 12 receives the first medical image from the laparoscope device 200, the processing unit 12 performs dehazing on the first medical image to obtain a second medical image (i.e., a dehazed first medical image). In this embodiment, the processing unit 12 utilizes "dark channel prior" (DCP) to generate a dark channel image. The dark channel image relates to some of the pixels of the first medical image that have a very low intensity (e.g., close to zero) in at least one color channel. Subsequently, the processing unit 12 calculates an atmospheric light value which relates to global atmospheric light and which is the largest pixel value of the dark channel image. Then, the processing unit 12 calculates a transmission image relating to a portion of light that is not scattered during transmission in the air. Finally, the processing unit 12 acquires the second medical image based on the transmission image and the atmospheric light value. In other embodiments, the processing unit 12 may utilize different dehazing algorithms to dehaze the first medical image, and this disclosure is not limited in this respect.

In step S32, the processing unit 12 converts the first medical image and the second medical image from an RGB (red, green, blue) color space to an HSV (hue, saturation, value) color space to acquire a plurality of first saturation values relating to the pixels of the first medical image, and a plurality of second saturation values relating to the pixels of the second medical image.

In step S33, the processing unit 12 acquires a saturation difference value based on the first saturation values and the second saturation values. In one embodiment, the saturation difference value is a difference between an average of the first saturation values and an average of the second saturation values. In one embodiment, the saturation difference value is a difference between a first difference value and a second difference value, where the first difference value is a difference between a largest one and a smallest one of the first saturation values, and the second difference value is a difference between a largest one and a smallest one of the second saturation values. However, this disclosure is not limited in this respect.

In step S34, the processing unit 12 acquires a correction value based on the first medical image and the threshold value stored in the storage unit 11.

Figure 3:
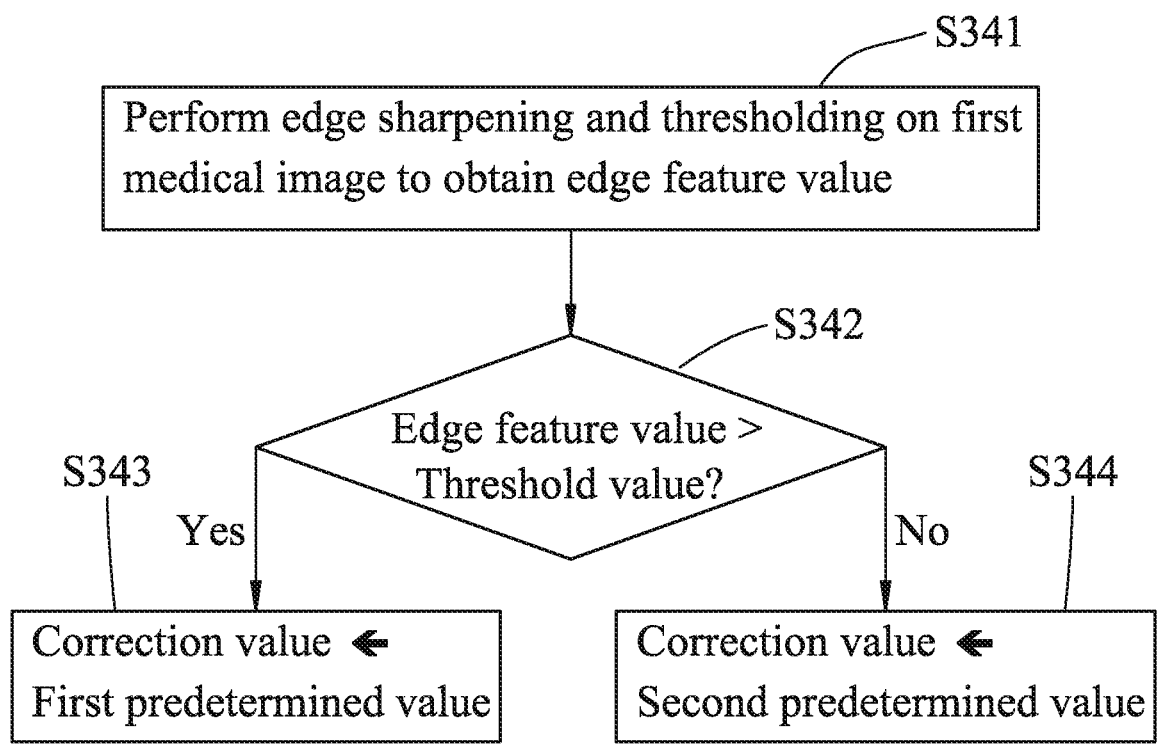

Further referring to FIG. 3, in this embodiment, step S34 include sub-steps S341 to S344.

In sub-step S341, the processing unit 12 performs edge sharpening and thresholding on the first medical image, thereby obtaining a plurality of edge pixels (e.g., black pixels of the sharpened and thresholded first medical image) relating to edges of objects in the first medical image. A total number of the edge pixels serves as an edge feature value relating to the first medical image.

In sub-step S342, the processing unit 12 determines whether the edge feature value is greater than the threshold value. The flow goes to sub-step S343 when the processing unit 12 determines that the edge feature value is greater than the threshold value, and goes to sub-step S344 when otherwise.

In sub-step S343, the processing unit 12 makes the first predetermined value serve as the correction value.

In sub-step S344, the processing unit 12 makes the second predetermined value serve as the correction value.

In order to prevent over-correction on color cast due to a large saturation difference value when the haze level of the first medical image is low, or to prevent under-correction on color cast due to a small saturation difference value when the haze level of the first medical image is high, this embodiment uses the edge sharpening level of the first medical image to serve as a criterion for determining the haze level of the first medical image. The edge feature value being greater than the threshold value represents a high haze level, so the first predetermined value which is greater than the second predetermined value is selected as the correction value; and the edge feature value being smaller than the threshold value represents a low haze level, so the second predetermined value is selected as the correction value.

In step S35, the processing unit 12 acquires a saturation correction value based on the saturation difference value and the correction value. In this embodiment, the saturation correction value is a product of the saturation difference value and the correction value, but this disclosure is not limited in this respect.

In step S36, the processing unit 12 corrects the second medical image based on the saturation correction value to obtain a third medical image (i.e., a corrected second medical image, also a corrected dehazed first medical image). In one embodiment, the third medical image is obtained by subtracting the saturation correction value from the second saturation value of each of the pixels of the second medical image. In one embodiment, the third medical image is obtained by adding the saturation correction value to the second saturation value of each of the pixels of the second medical image. In one embodiment, the third medical image is obtained by multiplying the second saturation value of each of the pixels of the second medical image by the saturation correction value. In one embodiment, the third medical image is obtained by dividing the second saturation value of each of the pixels of the second medical image by the saturation correction value. However, this disclosure is not limited in this respect.

In summary, the embodiment of the method for correcting a dehazed medical image according to this disclosure utilizes the processing unit 12 to convert the first and second medical images to the HSV color space for obtaining the first and second saturation values. Since the saturation components of the images have low sensitivity in terms of environmental brightness, the third medical image that is obtained by correcting the second medical image based on the first and second saturation values may be free of color cast, thereby promoting identifiability of the medical image.

In an embodiment, the disclosure relates to a method for correcting a dehazed medical image. The method includes steps of: (A) acquiring a plurality of first saturation values of a first medical image in an HSV color space, and a plurality of second saturation values of a second medical image in the HSV color space, the second medical image being obtained by performing dehazing on the first medical image, the first saturation values relating to pixels of the first medical image, the second saturation values relating to pixels of the second medical image; (B) acquiring a saturation difference value based on the first saturation values and the second saturation values; (C) acquiring a correction value based on the first medical image and a threshold value; (D) acquiring a saturation correction value based on the saturation difference value and the correction value; and (E) correcting the second medical image based on the saturation correction value to obtain a third medical image.

In a further embodiment, the disclosure relates to at least one of the preceding embodiments, wherein, in step (B), the saturation difference value is a difference between an average of the first saturation values and an average of the second saturation values.

In a further embodiment, the disclosure relates to at least one of the preceding embodiments, wherein, in step (B), the saturation difference value is a difference between a first difference value and a second difference value, the first difference value being a difference between a largest one and a smallest one of the first saturation values, the second difference value being a difference between a largest one and a smallest one of the second saturation values.

In a further embodiment, the disclosure relates to at least one of the preceding embodiments, wherein step (C) includes sub-steps of: (C-1) performing edge sharpening and thresholding on the first medical image to obtain an edge feature value relating to the first medical image; (C-2) determining whether the edge feature value is greater than the threshold value; (C-3) upon determining that the edge feature value is greater than the threshold value, making a first predetermined value serve as the correction value; and (C-4) upon determining that the edge feature value is not greater than the threshold value, making a second predetermined value serve as the correction value.

In a further embodiment, the disclosure relates to at least one of the preceding embodiments, wherein the edge feature value is a number of black pixels of the first medical image on which the edge sharpening and the thresholding have been performed, and wherein the second predetermined value is smaller than the first predetermined value.

In a further embodiment, the disclosure relates to at least one of the preceding embodiments, wherein, in step (D), the saturation correction value is a product of the saturation difference value and the correction value.

In a further embodiment, the disclosure relates to at least one of the preceding embodiments, wherein step (E) includes subtracting the saturation correction value from each of the second saturation values to obtain the third medical image.

In a further embodiment, the disclosure relates to at least one of the preceding embodiments, wherein step (E) includes adding the saturation correction value to each of the second saturation values to obtain the third medical image.

In a further embodiment, the disclosure relates to at least one of the preceding embodiments, wherein step (E) includes multiplying each of the second saturation values by the saturation correction value to obtain the third medical image.

In a further embodiment, the disclosure relates to at least one of the preceding embodiments, wherein step (E) includes dividing each of the second saturation values by the saturation correction value to obtain the third medical image.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for correcting a dehazed medical image, comprising steps of:
   (A) acquiring a plurality of first saturation values of a first medical image in an HSV color space, and a plurality of second saturation values of a second medical image in the HSV color space, the second medical image being obtained by performing dehazing on the first medical image, the first saturation values relating to pixels of the first medical image, the second saturation values relating to pixels of the second medical image;
   (B) acquiring a saturation difference value based on the first saturation values and the second saturation values;
   (C) acquiring a correction value based on the first medical image and a threshold value;
   (D) acquiring a saturation correction value based on the saturation difference value and the correction value; and
   (E) correcting the second medical image based on the saturation correction value to obtain a third medical image.

2. The method of claim 1, wherein, in step (B), the saturation difference value is a difference between an average of the first saturation values and an average of the second saturation values.

3. The method of claim 1, wherein, in step (B), the saturation difference value is a difference between a first difference value and a second difference value, the first difference value being a difference between a largest one and a smallest one of the first saturation values, the second difference value being a difference between a largest one and a smallest one of the second saturation values.

4. The method of claim 1, wherein step (C) includes sub-steps of:
   (C-1) performing edge sharpening and thresholding on the first medical image to obtain an edge feature value relating to the first medical image;
   (C-2) determining whether the edge feature value is greater than the threshold value;
   (C-3) upon determining that the edge feature value is greater than the threshold value, making a first predetermined value serve as the correction value; and
   (C-4) upon determining that the edge feature value is not greater than the threshold value, making a second predetermined value serve as the correction value.

5. The method of claim 4, wherein the edge feature value is a number of black pixels of the first medical image on which the edge sharpening and the thresholding have been performed, and wherein the second predetermined value is smaller than the first predetermined value.

6. The method of claim 1, wherein, in step (D), the saturation correction value is a product of the saturation difference value and the correction value.

7. The method of claim 1, wherein step (E) includes subtracting the saturation correction value from each of the second saturation values to obtain the third medical image.

8. The method of claim 1, wherein step (E) includes adding the saturation correction value to each of the second saturation values to obtain the third medical image.

9. The method of claim 1, wherein step (E) includes multiplying each of the second saturation values by the saturation correction value to obtain the third medical image.

10. The method of claim 1, wherein step (E) includes dividing each of the second saturation values by the saturation correction value to obtain the third medical image.

* * * * *